United States Patent

[11] 3,572,440

| [72] | Inventors | Stanley O. Hutchison<br>Bakersfield;<br>John C. Mc Kinnell, Taft; Glen W.<br>Anderson, Oildale, Calif. |
|---|---|---|
| [21] | Appl. No. | 839,662 |
| [22] | Filed | July 7, 1969 |
| [23] | | Continuation-in-part of Ser. No. 704,832,<br>Feb. 12, 1968, Pat. No. 3,463,231,<br>and Ser. No. 720,977, April 12, 1968,<br>Pat. No. 3,486,560. |
| [45] | Patented | Mar. 30, 1971 |
| [73] | Assignee | Chevron Research Company<br>San Francisco, Calif. |

[54] AQUEOUS FOAMED WELL CIRCULATION FLUIDS CONTAINING AN ACID COMPONENT AND THEIR USE IN THE TREATMENT OF WELLS
19 Claims, No Drawings

[52] U.S. Cl. .................................................. 166/311,
166/307, 166/309, 252/8.55, 252/307

[51] Int. Cl. ........................................................ B01j 13/00,
E21b 43/27
[50] Field of Search ............. ........................ 166/309,
307, 274, 273, 311, 312; 252/8.5, 8.55 (B,C), 307,
3, 6, 6.5, 8.05; 175/69

[56] References Cited
UNITED STATES PATENTS

| 3,022,251 | 2/1962 | Thiegs........................... | 252/307 |
|---|---|---|---|
| 3,219,115 | 11/1965 | Hower et al. ................. | 166/309X |
| 3,273,643 | 9/1966 | Billings et al. ................ | 166/309X |
| 3,463,231 | 8/1969 | Hutchison et al............. | 166/303 |

*Primary Examiner*—Stephen J. Novosad
*Attorneys*—A. L. Snow, F. E. Johnston, John Stoner, Jr. and D. L. Hagmann

ABSTRACT: Preformed well circulation foams containing an acid component are used for the treating of wells, particularly for the stimulation of oil wells.

3,572,440

AQUEOUS FOAMED WELL CIRCULATION FLUIDS CONTAINING AN ACID COMPONENT AND THEIR USE IN THE TREATMENT OF WELLS

CROSS REFERENCES TO RELATED APPLICATIONS

This application is a continuation-in-part of copending applications, Ser. No. 704,832 filed Feb. 12, 1968, now U.S. Pat. No. 3,463,231, and Ser. No. 720,977 filed Apr. 12, 1968, now U.S. Pat. No. 3,486,560. In the patents, we have disclosed improved methods for the circulation of foamed fluids in wells.

FIELD OF INVENTION

This invention relates to aqueous well circulation foams containing an acid component and to the method for the use of these foams for the treatment of wells, particularly for the stimulation and cleaning of oil wells.

BACKGROUND OF INVENTION

In the recovery of minerals such as petroleum from subterranean formations or voids by means of a well, loss of production is often associated with the accumulation of deposits in the producing zone of the well which inhibit oil flow into the well. It is known to wash or flush clogged wells with aqueous solutions of strong mineral acid such as hydrochloric acid, or with a mixture of this acid with hydrofluoric acid, in order to dissolve acid soluble materials in the deposits and thereby facilitate cleaning the well.

In the cleaning of a well by the use of acidic solutions there are certain disadvantages, particularly that of penetration of the producing formation under the substantial pressurehead associated with the presence of a liquid column of aqueous acid in a well, and the contacting of metal pumps and the like in removing the corrosive acid solution from the well.

INVENTION DESCRIPTION

It has now been found that an aqueous preformed well circulation foam containing a mineral or lower organic acid component in an amount in the range 0.005 to 35 parts per 100 parts of foam (weight) or at least sufficient to yield a foam pH of less than 6 may be introduced into a well and employed to acidify the well bore and to facilitate stimulation of the producing zone of the well as by cleaning and the like. A column of acidified foam exerts a small pressurehead in a well relative to a column of liquid. Therefore, undesirable penetration of surrounding formations is comparatively small. Acidified foam can be relatively easily removed from a well, for example by a followup circulation of a neutral or basic foam.

Surprisingly, the desirable flow characteristics of preformed well circulation foams containing a mineral acid component appear to undergo relatively minor adverse effects in their use as fluids in a well.

By foam circulation, as used herein, is meant by definition the movement of foam from place to place.

By an aqueous well circulation foam, as used herein, is meant by definition a foam produced from a gas and a foamable aqueous solution containing in parts by weight per 100 parts of the solution from about 0.005 to 10 parts of an organic foaming agent. Preferably, the foam has a gas-to-liquid volume quotient, standard cubic feet per gallon respectively in the range from about 3 to 50.

By a preformed foam, as used herein, is meant a foam which is generated out of contact with the solids and/or liquids naturally encountered in a well bore, i.e., a foam formed out of contact with contaminants associated with a well bore environment, including cuttings, oil, brine, and the like.

The aqueous foams of the present invention are preferably circulated or introduced into a well at velocities less than about 600 feet per minute.

In a preferred embodiment of the invention an aqueous gas-in-liquid foam is prepared by introducing water, a detergent concentrate, and a mineral acid solution into a foam generation unit at rates sufficient to produce a foamable solution which contains in parts by weight for each 100 parts thereof about 1—2 parts of an organic foaming agent, for example a linear alkylbenzene sulfonic acid ($RC_6H_4SO_3H$) in which R is a $C_{11}$—$C_{14}$ alkyl group mixture, and an acid mixture of about 7.5 parts of hydrochloric acid and 2.5 parts of hydrofluoric acid. The foamable solution and a gas, for example, air, are mixed in the foam generator wherein a foam having a gas-to-liquid volume quotient (standard cubic feet per gallon) in the range 5—20 is generated and passed into the well under a pressure sufficient to circulate the foam.

The amount of the acid component which should be used in preparing an acid-containing foam varies depending upon the particular acid or mixture of acids and the acidification desired to be accomplished. In general, the use in parts by weight of an amount of the acid in the range 0.005 to 20 parts per 100 parts of foam results in a satisfactory foam. Alternatively, at least sufficient of the acid should be added to the foamable solution to yield a pH of less than 6. Where a larger acidification capacity for the foam is needed, larger relative amounts of the acid may be use, for example as much as about 35 parts of acid per 100 parts of foam.

Mineral acids in general are useful in the practice of the invention as are likewise the stronger water soluble organic acids such as formic, acetic and the halogen substituted acetic acids, i.e., lower organic acids.

Mineral acids preferred for use in the present invention are hydrochloric, hydrofluoric and phosphoric acids and mixtures thereof. Other useful acids include sulfuric, sulfamic and nitric acid.

Other organic acids useful in the instant invention include benzene sulfonic, toluene sulfonic and xylene sulfonic acids and the like.

Representative halogen substituted acetic acids include chloroacetic, dichloroacetic, trichloroacetic, trifluoroacetic acids and the like.

Gas-in-liquid foam generation is well known in the art (see, for example, Encyclopedia of Chemical Technology, Vol. 6, Interscience Encyclopedia, Inc., New York (1951); U.S. Pat. No. 3,212,762). Large volumes and a ready supply of foam are required for the practice of the instant invention. An eductor or venturi-type nozzle arrangement followed by down stream in-line mixing baffles or steel wool or the like, has been found to yield satisfactory gas-in-liquid foams and is the preferred mode for use herein.

In the production of the subject foams a gas such as air, nitrogen, methane, natural gas, inert exhaust gas, or carbon dioxide and the like is used. Air is preferred where natural gas pressures are low; at high formation pressures a relatively inert gas, i.e., nitrogen, air and carbon dioxide or carbon dioxide is preferred.

Organic foaming agents which are soluble in acidic (pH<6) aqueous solutions are in general satisfactory for use in the production of acidified preformed foams, and these include in general foaming agents which do not form water insoluble organic carboxylic acids upon contact with mineral acids or strong organic acids such as trichloroacetic acid. Organic acids of the formula $RSO_3H$ and mixtures thereof where R is an oleophilic radical having a carbon atom content in the range from about 8 to 20 are preferred foaming agents for use herein. Ordinarily these materials are available as articles of commerce in the form of their water soluble salts, sodium for example. Upon addition of these salts to the aqueous acidic solutions herein, the sulfonic acid is formed. Thus the salts may be employed. The free acids are preferred.

Organic foaming agents are in general satisfactory for use herein provided that an aqueous solution containing 0.5 parts of the agent and 2 parts of hydrogen chloride has a Ross-Miles initial foam height of at least 10 centimeters and a cumulative foam height of at least 30 centimeters (cf. Ross, J., and Miles, G. D., "An Apparatus for Comparison of Foaming Properties of Soaps and Detergents," Oil and Soap, Vol. 18, 1941, Pages 99—102; ASTM D 1173-53 (1965).

By a Ross-Miles initial foam height, as used herein, is meant the initial or O-time foam height as obtained in the standard Ross-Miles foam analysis method.

By a cumulative foam height, as used herein, is meant the sum of the foam heights at the 0-, 1-, 2-, 5- and 10-minute intervals as obtained in the Ross-Miles method.

Useful foaming agent concentrations vary depending upon the particular agent being used. In general, in parts by weight per 100 parts of foamable solution, the amount of the agent desirably used is in the range from about 0.05 to 2. Larger amounts of foaming agent can also be used, but such use is relatively inefficient in view of the cost, particularly at concentrations in excess of about 3—5 parts per 100. Usually relatively larger amounts of foaming agent are required for comparable results where acid is a component of the foam than in the case where no acid is present.

By organic foaming agents is meant organic compounds, salts of organic compounds, and mixtures thereof, whose aqueous solutions foam when air is bubbled through the solution. These agents are known to the art as surface active compounds and are classified as anionic, cationic, nonionic and amphoteric agents (see, for example, "Detergents and Emulsifiers," 1966 Annual, John W. McCutcheon, Inc., also Surface Active Agents, Vol. 1 and 2, A. M. Schwartz, J. W. Perry and J. Berch, Interscience Publishers, Inc., New York (1949 and 1958)).

Preferred well circulation foams have, in general, a gas-to-liquid volume quotient (standard cubic feet per gallon, respectively) in the range from about 3 to 50, respectively, more preferably in the range from about 5 to 20. For extra heavy duty usage, foams having a quotient as low as 1—2 may be satisfactory. These foams have a relatively high density and tend to be more difficult to circulate, i.e., have a higher work requirement. On the other hand, with increasing gas-to-liquid quotients, bubble sizes are relatively larger and foam characteristics, including stability under conditions of flow in a well, become progressively poorer.

Anionic foaming agents which are soluble in aqueous acid are preferred for use in the preparation of the subject acidic foamed well circulation fluids. Of these agents, the surfactants of the formula RSO3H in which R represents an oleophilic radical, are preferred for use herein. They yield foams which are especially useful acidic well circulation fluids. The oleophilic radical R may be a hydrocarbon radical containing from about 8 to 20 carbon atoms or a radical of the formula $R'(OCH_2CH)_m$ in which $R'$ is an oleophilic hydrocarbon radical containing from about 8 to 18 carbon atoms and $m$ is a whole number in the range from 1 to about 15, preferably 3 to 10, inclusive.

Hydrocarbon radicals in general having the specified carbon atom content are contemplated as groups R or R' in the formulas above. Representative classes include such radicals as alkyl, cycloalkyl, aryl, alkylaryl, alkenyl, alkylcycloalkyl, alkenylcycloalkyl, alkenylaryl, arylalkenyl, and the like radicals. Preferred hydrocarbon radicals are the aliphatic or alkylaryl hydrocarbon radicals.

Representative preferred classes of foaming agents useful in the instant invention include the alkylbenzene sulfonic, the paraffin sulfonic, the alpha-olefin sulfonic, the internal olefin sulfonic acids and the like. Of these foaming agents, the class of alpha-olefin sulfonic acids is particularly preferred. These materials are a complex mixture of compounds which yield acidic foams which are especially effective well circulation fluids. In general, they yield foams which are dense and made up of relatively uniform small bubbles. The small bubble sizing appears to promote foam stability and to impart to them excellent circulation characteristics.

By definition as used herein, by the term "alpha-olefin sulfonic acid" is meant the product mixture obtained at a reaction temperature in the range from about 10 to 60° C. from the reaction of an alpha-olefin, $RCH=CH_2$, where R is an alkyl radical of the $C_8$—$C_{18}$ range, with sulfur trioxide diluted by air with the product being neutralized and hydrolyzed at a temperature in the range from about 50 to 130° C. and acidified to yield the sulfonic acid. (See, for example "Alpha-Olefins in the Surfactant Industry" by T. H. Liddicoet, the American Oil Chemists Society, Nov. 1963, Vol. 40, No. 11, pp 631—636, and "Alpha Olefin Sulfonates from a Commercial SO3-Air Reactor" by D. M. Marquis et al., ibid, Vol. 43, No. 11, pp. 607—614 (1966)).

The use of molecular mixtures of a given foaming agent species as well as individual molecular species of the aforedescribed organic foaming agents is contemplated. Mixtures which contain two or more foaming agent species are also contemplated. In particular, of the mixtures of foaming agent species, the alkylbenzene sulfonic and alpha-olefin sulfonic acids are preferred for use in the production of acidic foams in which each foaming agent species is in turn a molecular mixture, for example, a $C_{10}$—$C_{15}$-alkylbenzene sulfonic acid molecular mixture plus a $C_{14}$13 $C_{18}$ alpha-olefin sulfonic acid mixture.

Representative foaming agents useful in the practice of the subject invention include polypropylene tetramer benzene sulfonic, polypropylene pentamer benzene sulfonic, n-dodecylbenzene sulfonic, s-tetradecylbenzene sulfonic, s-hexadecylbenzene sulfonic acids, $n$-$C_{15}$—$C_{20}$-alfa olefin sulfonic acid mixtures, $n$-$C_{15}$—$C_{20}$-internal olefin sulfonic acid mixtures and the like.

The following examples further illustrate the invention.

EXAMPLE 1

An aqueous foamable solution containing 1 part by weight of a detergent range alkylbenzene sulfonate per 100 parts of water was prepared. A second aqueous solution containing 15 parts of hydrochloric acid and 5 parts of hydrofluoric acid per 100 parts of solution was added to the foamable solution in small incremental portions. After each addition the solution was tested for foamability and found to be satisfactory until the point where 33 ml. of the acid solution had been added. The foam was then poor and collapsed readily. However, upon the addition of more of the foaming agent, the quality of the foam was improved.

EXAMPLE 2

An aqueous solution, 100 ml., containing 5 parts of phosphoric acid and 1 part of ammonium $nC_{15}$—$C_{18}$ alpha-olefin sulfonate was foamed by vigorous mechanical mixing in a 600 ml. beaker. A fine dry dense foam filling the beaker to the three-fourth height was formed.

EXAMPLE 3

An aqueous solution was prepared containing 1 volume percent of a linear alkylbenzene sulfonic acid ($RC_6H_5$-$SO_3H$) in which R was a $C_{11}$—$C_{14}$ alkyl group mixture and in which the acid had $C_{11}$—$C_{14}$ average molecular weight of 360. This acidic solution was tested by foaming with air with the foam gas-to-liquid volume quotient and corresponding results being as follows:

| Volume rate, Cu. ft.[1]/gal. | Remarks |
| --- | --- |
| 33.3 | Foam breaks in first ⅓ of foam column. |
| 25 | Foam circulates satisfactorily, soupy. |
| 20 | Wet foam, fairly stable. |
| 13 | Good foam, dense and stable. |
| 10 | Excellent stable foam. |

[1] Standard cubic feet of air per gallon of foamable solution.

The foregoing examples demonstrate that foams containing an acid component are satisfactory foam circulation fluids for use in wells. The relative amount of the acid desirably used may vary widely but appears in general to be in parts by weight in the range from about 0.1 to 15 parts per 100 parts of foam.

We claim:

1. The method of treating a well which comprises incorporating an acid into a preformed well circulation foam and introducing the resulting acidic foam into the well, said acid being present in the foam in an amount of at least about 0.005 parts per 100 parts of the foam, wherein the acid is selected from the group consisting of mineral acids and lower organic acids.

2. The method as in claim 1 further characterized in that said acid is present in an amount in the range from about 0.1 to 15 parts per 100 parts of foam.

3. The method as in claim 2 further characterized in that said treatment comprises cleaning the well.

4. The method as in claim 2 further characterized in that said acid is hydrochloric acid.

5. The method as in claim 2 further characterized in that said acid is selected from the group consisting of hydrochloric, hydrofluoric, phosphoric acid and mixtures thereof.

6. The method as in claim 2 further characterized in that said acid is a lower organic acid.

7. The method as in claim 2 further characterized in that said acid is an alkylbenzene sulfonic acid.

8. The method as in claim 2 further characterized in that the acid is phosphoric acid.

9. In the circulation of a preformed foam in a well wherein the foam is an aqueous gas-in-liquid foam obtained from a gas and an aqueous solution containing a foaming agent, the improvement which comprises adding to the solution an amount of an acid in the range from about 0.005 to 35 parts per 100 parts of the solution, said acid being selected from the group consisting of mineral acids, lower organic acids and mixtures thereof, the foregoing parts being by weight.

10. The improvement as in claim 9 further characterized in that the foaming agent is of the formula $RSO_3H$ wherein R is selected from the group consisting of hydrocarbon radicals having a carbon atom content in the range 8 to 20, and radicals of the formula $R'(OCH_2CH_2)_m$ wherein R' is a hydrocarbon radical having a carbon atom content in the range 8 to 18 and $m$ is a whole number in the range 1 to 15; in that the amount of the acid is in the range 0.1 to 15; in that the acid is selected from the group consisting of hydrochloric, phosphoric and hydrofluoric acids, lower organic acids and mixtures thereof.

11. The improvement as in claim 9 further characterized in that the acid is a mixture of hydrochloric and hydrofluoric acid.

12. The improvement as in claim 9 further characterized in that the acid is phosphoric acid.

13. The improvement as in claim 9 further characterized in that the acid is an alkylbenzene sulfonic acid.

14. The aqueous preformed well circulation foam containing for each 100 parts thereof an amount of an acid in the range from about 0.1 to 15 parts, wherein said acid is selected from the group consisting of mineral acids, lower organic acids and mixtures thereof, the foregoing parts being by weight.

15. The composition as in claim 14 further characterized in that said acid is selected from the group consisting of hydrochloric, hydrofluoric, phosphoric acids and mixtures thereof.

16. The composition as in claim 14 further characterized in that said acid is selected from the group consisting of lower organic acids and mixtures thereof.

17. The composition as in claim 14 further characterized in that said foam is prepared by the use of a foaming agent of the formula $RSO_3H$ wherein R is an oleophilic hydrocarbon radical.

18. The composition as in claim 14 further characterized in that said foam is prepared by the use of a foaming agent of the formula $R(OCH_2CH_2)_mSO_3H$ wherein R is a hydrocarbon radical having a carbon atom content in the range 8 to 18 and $m$ is a whole number in the range 1 to 15.

19. The aqueous foam composition consisting essentially of an organic foaming agent, water, a gas and an acidic component wherein for each 100 parts by weight said foam contains an amount of acid in the range from about 0.005 to 35 parts, said acid being a mineral acid, a lower organic acid or a mixture of said acids, and said foam being a preformed foam.